UNITED STATES PATENT OFFICE.

ADOLFO MARTINEZ URISTA, OF MEXICO, MEXICO.

COMPOSITION FOR PREVENTING SCALE IN BOILERS.

950,582.　　　Specification of Letters Patent.　　Patented Mar. 1, 1910.

No Drawing.　　Application filed May 21, 1909.　Serial No. 498,089.

*To all whom it may concern:*

Be it known that I, ADOLFO MARTINEZ URISTA, a citizen of the United Mexican States, residing at the city of Mexico, Federal District, Mexico, have invented a new or Improved Composition of Matter for Preventing the Formation of Scale in Steam-Boilers and for Loosening Scale Already Existing Therein, of which the following is a full, clear, and exact specification.

The liquid constituting my invention consists of a distillation of the following named plants: ramie, tobacco, nopal, neutleth, agave, and amaryllis, the alcohol extracts of said plants being mixed with water, and thoroughly commingled and incorporated with one another. The various alcoholic extracts are used in substantially equal proportions.

In practicing my said invention, I find that while the composition thereof may be made in various proportions of the different constituents, yet that in 100 parts of the liquid constituting my invention, excellent results are obtained by using 80 parts of water, and twenty parts of the united or commingled alcohol extracts of ramie, tobacco, nopal, neutleth, agave and amaryllis.

The composition is to be used within boilers by the introduction thereof with the feed water, according to the hardness and impurity of the water supply. The formation of scale, which is a low conductor of heat, increases the quantity of fuel required to generate steam, and when said scale has increased so much that more than the normal quantity of fuel is necessary, it is then important to loosen the said scale. When so used it will be sufficient to loosen the scale from the interior surface of the boiler and cause any boiler incrustations, such as the carbonates and sulfates of calcium, to scale off. The use of this composition produces no injury to the surfaces treated, by internal corrosion, nor does it increase the internal corrosion normally going on within boilers.

I claim as my invention.

1. A composition for removing the scale from the internal surface of boilers, consisting of water and distillations of ramie, tobacco, nopal, neutleth, agave, and amaryllis.

2. A composition for removing the scale from the internal surface of boilers, consisting of alcohol extracts by distillation of ramie, tobacco, nopal, neutleth, agave, and amaryllis in solution with water.

3. A composition for removing the scale from the internal surface of boilers, consisting of a mixture of twenty parts of the alcohol commingled and united extracts by distillation of ramie, tobacco, nopal, neutleth, agave, and amaryllis respectively, with eighty parts of water all in liquid measure.

In testimony whereof, I, the said ADOLFO MARTINEZ URISTA, have hereunto set my hand and seal at the city of Mexico aforesaid, in the presence of two subscribing witnesses.

ADOLFO MARTINEZ URISTA. [L. S.]

Witnesses:
K. C. HAUDJEAN,
JOSÉ MATA.